July 10, 1962 N. REIS 3,043,945
SPOT WELDING NOZZLE PRESSURE CONTROL
Filed April 22, 1960 3 Sheets-Sheet 1

INVENTOR.
NORMAN REIS
BY
Richard S. Shreve Jr.
ATTORNEY

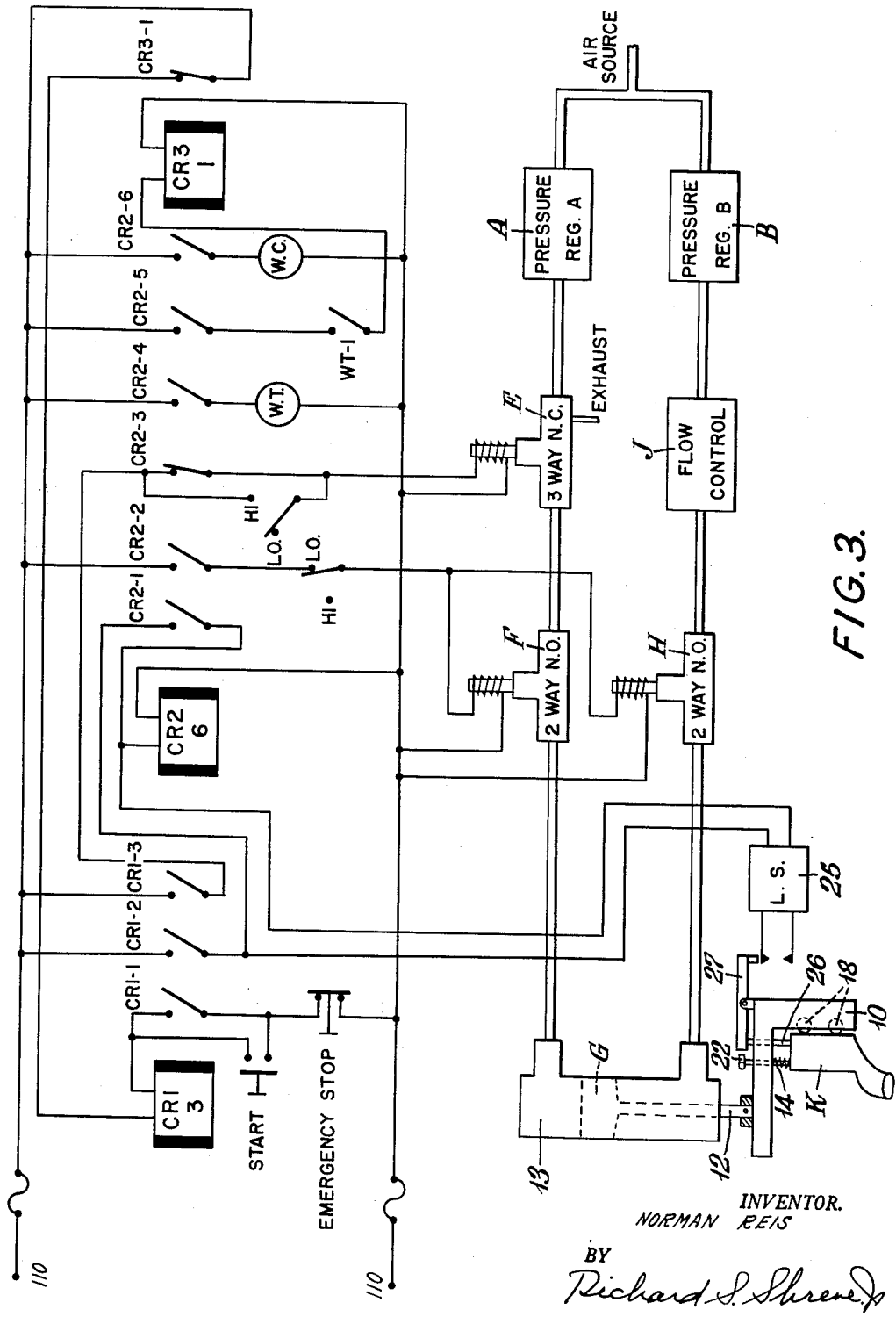

United States Patent Office 3,043,945
Patented July 10, 1962

3,043,945
SPOT WELDING NOZZLE PRESSURE CONTROL
Norman Reis, Fords, N.J., assignor to Union Carbide Corporation, a corporation of New York
Filed Apr. 22, 1960, Ser. No. 24,155
4 Claims. (Cl. 219—127)

This invention relates to spot welding nozzle pressure control, and more particularly to control of the nozzle pressure in gas shielded arc spot welding.

In such spot welding, it is essential for the torch cup or nozzle to bear upon the workpiece with sufficient pressure to maintain intimate contact between the parts to be joined.

Prior to the invention described herein, the spot welding of light gage (0.005 in. thick) members presented numerous difficulties. Most apparent were problems encountered with the fabrication of corrugated and unbacked sheet members.

Excessive torch pressures in the welding zone resulted in the physical deflection of the members to be welded, and subsequent joining yielded a distorted and undesirable configuration. Furthermore, surface imperfections were caused by the torch cup striking the work with a relatively uncontrolled impact force, resulting in indentations on the upper surface to be welded.

Irregular configurations involving varying heights in members to be welded increased the complexity of arc initiation resulting in still another undesirable variable affecting weld consistency. In order to accommodate the irregular member, external adjustments (jigging, fixturing and cam settings) to the torch travel were necessary to compensate for any differential in surface configuration. Such adjustments were both costly and time consuming and yet did not afford complete assurance of good weld quality.

It is therefore the main object of the present invention to control the contact pressure between the parts to be joined so as not to be excessive over that necessary to provide intimate contact.

Other objects are to produce a mechanism directly sensitive to the reactant force created upon torch to work contact, and to produce a system capable of differentiating between various contact forces and yet maintaining simplicity in form and consistency in operation.

In the drawings:

FIG. 3 is a wiring and pneumatic diagram.

Figure 1:
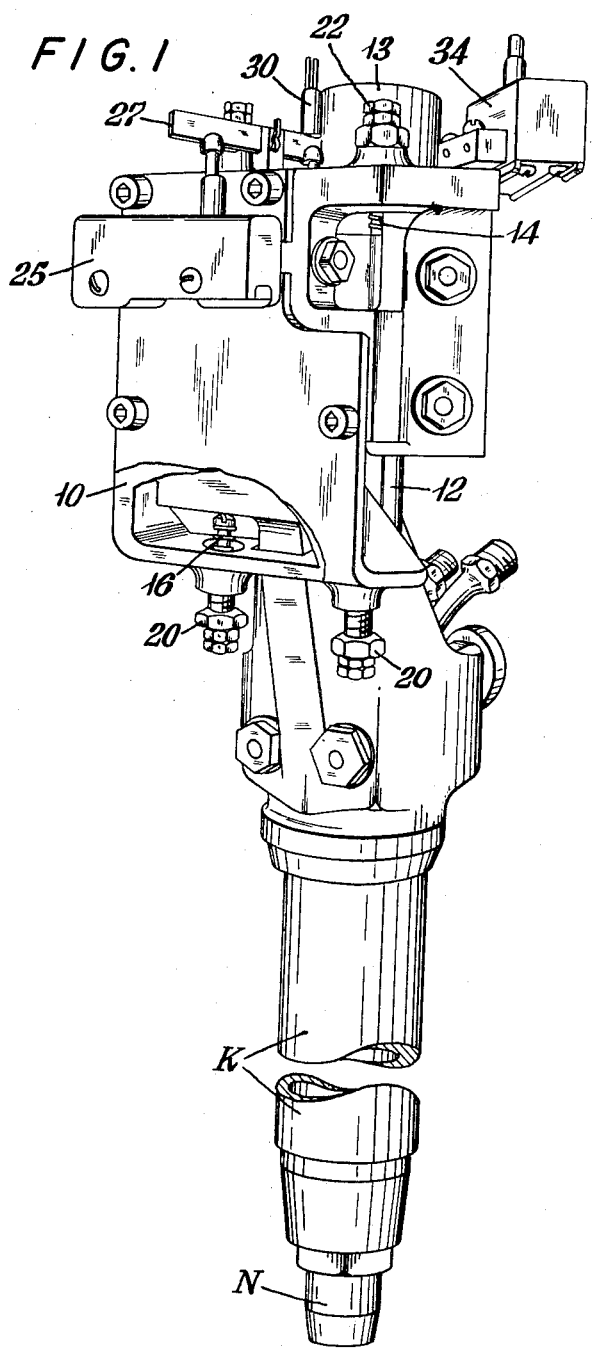
FIG. 1 is a perspective view of an apparatus according to the preferred embodiment of the present invention.
Figure 2:
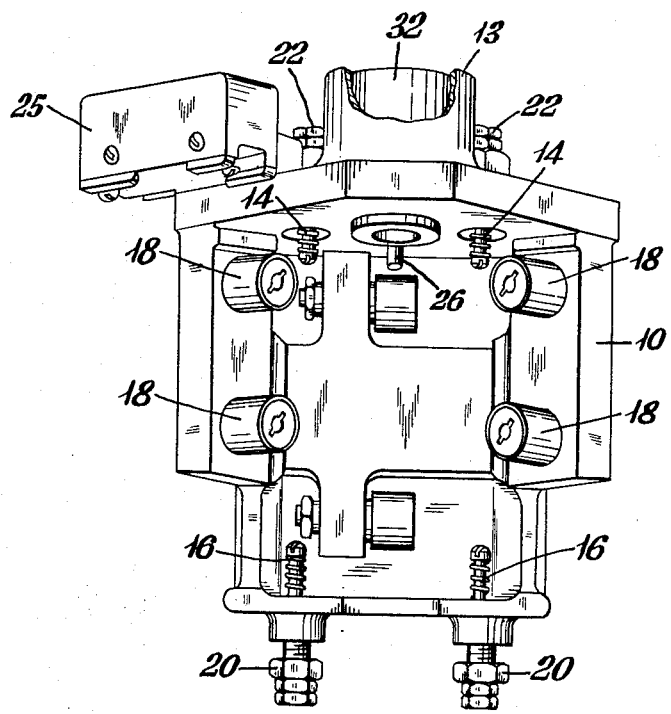
FIG. 2 is a perspective view of the torch holder.

The mechanism comprises a torch holder slide bracket 10 capable of accommodating a mechanized spot welding torch K of the type shown in Pilia Patent No. 2,550,495. This bracket is fastened to the piston rod 12 of a pneumatic cylinder 13 (FIG. 3) so that vertical motion is imparted to both the slide and torch. By means of upper and lower compression springs 14 and 16 respectively, the torch is free to traverse vertically within the slide for a predetermined distance. Roller bearings 18 minimize friction due to such torch movement.

The lower compression springs 16 as adjusted by adjusting screws 20 effectively reduce the torch weight to an amount sufficient to overcome bearing friction. This establishes the minimum sensitivity point necessary for actuating the sequence initiating switch 25. The upper compression springs 14 as adjusted by the adjusting screws 22 permit still further variance of the sensitivity from the minimum sensitivity point as established by the lower compression springs.

A reactant force experienced by the torch nozzle N as it contacts the work overcomes the weight of the torch, bearing friction, and any compression force preset by the upper compression springs 14. The torch bears upon the push rod 26 which subsequently initiates the sequence initiating switch 25 by means of movement through the lever 27. The reactant force required to actuate switch 25 varies directly with the predetermined spring load set on the upper compression springs 14.

Spring capacity is the only limitation upon the maximum force that can be predetermined. Spring loaded plunger 30 mechanically restrains switch 25 when using minimum sensitivity settings and prevents the premature actuation of switch 25 by erratic piston movement during the first ¾ in. of piston movement. However, once the piston attains constant velocity, the spring loaded plunger 30 is fully extended and is thus inoperative. Insulating bushing 32 is provided to electrically isolate the torch from the balance of the machine. Repeat limit switch 34 provides a means for automatically reinitiating the entire welding cycle.

FIG. 3 represents an air system used to control the pneumatic cylinder piston travel. In a low pressure system the rest position, piston rod 12 is fully retracted and spring loaded plunger 30 is fully depressed by bearing upon the cylinder. All solenoid air valves are de-energized. Two regulators A and B respectively, control the air pressure in the cylinder 13 and operate in such a manner as to impart a predetermined air pressure differential to the cylinder.

As soon as the starting means is actuated, three-way normally closed solenoid valve E is energized, and permits air pressure as controlled by air regulator A to flow through normally open two-way solenoid valve F, this then imparts a pressure to the upper portion of cylinder above the piston G. Simultaneously, a different air pressure as controlled by air regulator B flows through normally open two-way solenoid valve H. Subsequently, when the pressure at the top of the cylinder exceeds that below, the pressure differential forces the piston to travel downward. During the acceleration period, spring loaded plunger 30 serves to compensate for any inertial torch travel in the slide which may inadvertently actuate the sequence initiating switch 25. A flow control valve J is provided to insure smooth piston travel at controlled speeds.

The piston travels downward even after the torch K contacts the work. When the reactant force of the work upon the torch K exceeds the effective weight of the torch plus bearing friction and the spring load of the upper compression springs 14, the torch K bears upon the push rod 26 which moves the required distance necessary for imparting a force through lever 27 thus exciting sequence initiating switch 25. This in turn initiates two operations simultaneously.

First, two-way normally open solenoid valves F and H, respectively, are energized thus closing and sealing off the air flow to and from the cylinder. The three-way normally closed solenoid valve E is de-energized. At this point, the piston is in a fixed position and the only force being imparted to the work is the effective weight of the torch and the predetermined spring load of the upper compression springs.

Secondly, the weld cycle begins. When the weld cycle times out two-way solenoid valves F and H, respectively, are de-energized permitting the back pressure at the bottom of cylinder to return the piston to its neutral position by exhausting air above the piston through de-energized three-way valve E. The system is now ready to recycle.

Where high contact forces between the torch and the work are desired for example with heavy gage materials, the sequence switch 25 is used only to initiate the weld cycle and thereby maintain a free flow air system. The two-way normally open solenoid valves F and H, respectively, are circumvented by means of the electrical control, thus allowing any predetermined air differential to be imparted and exerted as a downward force to the torch.

In a low pressure system, sequence switch 25 is used to simultaneously control the air flow and initiate the welding cycle. In a high pressure system it is used principally to initiate the weld cycle.

What is claimed is:

1. Gas shielded arc torch spot welding method which comprises advancing a torch holder under fluid pressure toward the work until the torch nozzle contacts the work, continuing the fluid pressure to advance the holder beyond the travel of the torch against spring action therebetween, starting the welding cycle when the fluid pressure overcomes the spring action at a predetermined pressure of the nozzle upon the work, and maintaining said predetermined pressure of the nozzle upon the work for the duration of the welding cycle.

2. Gas shielded arc spot welding method which comprises advancing a torch holder under fluid pressure toward the work until the torch nozzle contacts the work to stop the advance of the torch, continuing the fluid pressure to advance the holder with respect to the torch and the work against spring action between the torch and holder, cutting off the source of fluid pressure and starting the welding cycle when the fluid pressure overcomes the spring action at a predetermined differential pressure of the nozzle against the work, and maintaining said differential pressure constant for the duration of the welding cycle.

3. Apparatus for gas shielded arc torch spot welding which comprises means for advancing a torch holder under fluid pressure toward the work until the torch nozzle contacts the work, means for continuing the fluid pressure to advance the holder beyond the travel of the torch against spring action therebetween, means for starting the welding cycle when the fluid pressure overcomes the spring action at a predetermined pressure of the nozzle upon the work, and means for maintaining said predetermined pressure of the nozzle upon the work for the duration of the welding cycle.

4. Apparatus for gas shielded arc spot welding which comprises means for advancing a torch holder under fluid pressure toward the work until the torch nozzle contacts the work to stop the advance of the torch, means for continuing the fluid pressure to advance the holder with respect to the torch and the work against spring action between the torch and the holder, means for cutting off the source of fluid pressure and starting the welding cycle when the fluid pressure overcomes the spring action at a predetermined differential pressure of said nozzle against the work, and means for maintaining said differential pressure constant for the duration of the welding cycle.

References Cited in the file of this patent

UNITED STATES PATENTS

| 2,845,525 | Groener et al. | July 29, 1958 |
| 2,898,445 | Slezak | Aug. 4, 1959 |